United States Patent
Sudoh

(10) Patent No.: US 9,772,469 B2
(45) Date of Patent: Sep. 26, 2017

(54) IMAGE FORMING LENS AND IMAGE CAPTURING DEVICE

(71) Applicant: Yoshifumi Sudoh, Saitama (JP)

(72) Inventor: Yoshifumi Sudoh, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/817,487

(22) Filed: Aug. 4, 2015

(65) Prior Publication Data

US 2016/0077310 A1    Mar. 17, 2016

(30) Foreign Application Priority Data

Sep. 17, 2014   (JP) .................. 2014-189093
Sep. 17, 2014   (JP) .................. 2014-189451

(51) Int. Cl.
  *G02B 9/60* (2006.01)
  *B07C 5/342* (2006.01)
  *G02B 15/16* (2006.01)
  *G02B 27/00* (2006.01)

(52) U.S. Cl.
  CPC .............. *G02B 9/60* (2013.01); *B07C 5/3422* (2013.01); *G02B 15/161* (2013.01); *G02B 27/0025* (2013.01)

(58) Field of Classification Search
  CPC ... G02B 9/60; G02B 9/62; G02B 9/64; G02B 15/161; G02B 15/173; G02B 15/28
  USPC .......... 359/754–757, 759, 690–691
  See application file for complete search history.

(56) References Cited

U.S. PATENT DOCUMENTS

| 4,653,876 A | * | 3/1987 | Yamagata | G02B 9/62 359/693 |
| 6,115,188 A | * | 9/2000 | Nishio | G02B 15/173 359/557 |
| 8,000,026 B2 | * | 8/2011 | Sugita | G02B 15/14 359/691 |
| 2007/0091467 A1 | * | 4/2007 | Yasui | G02B 15/161 359/754 |
| 2007/0201144 A1 | | 8/2007 | Sudoh | |
| 2007/0247726 A1 | | 10/2007 | Sudoh | |

(Continued)

FOREIGN PATENT DOCUMENTS

| CN | 104914559 | 9/2015 |
| CN | 204613496 U | 9/2015 |

(Continued)

OTHER PUBLICATIONS

U.S. Appl. No. 14/617,118, filed Feb. 9, 2015.

(Continued)

*Primary Examiner* — Jordan Schwartz
(74) *Attorney, Agent, or Firm* — Oblon, McClelland, Maier & Neustadt, L.L.P.

(57) ABSTRACT

An image forming lens is formed by sequentially arranging, from an object side to an image side, a first lens group having positive refractive power, an aperture stop, and a second lens group having positive or negative refractive power. The image forming lens satisfies a conditional expression:

$0.15 < D1a/D1 < 0.50$, where $D1a$ is an air space between the first positive lens and the second positive lens in the first lens group, and $D1$ is a distance on an optical axis from an object-side lens surface of the first positive lens to an image-side lens surface of the third positive lens in the first lens group.

20 Claims, 8 Drawing Sheets

(56) References Cited

U.S. PATENT DOCUMENTS

| | | |
|---|---|---|
| 2008/0278779 A1 | 11/2008 | Nishina et al. |
| 2009/0067060 A1 | 3/2009 | Sudoh |
| 2009/0122418 A1 | 5/2009 | Atsuumi et al. |
| 2009/0135500 A1 | 5/2009 | Sudoh et al. |
| 2009/0147375 A1 | 6/2009 | Sudoh et al. |
| 2009/0147380 A1* | 6/2009 | Yokoyama ............ G02B 15/161 359/766 |
| 2009/0323200 A1 | 12/2009 | Sudoh |
| 2010/0027136 A1 | 2/2010 | Ohashi et al. |
| 2010/0296180 A1 | 11/2010 | Sudoh et al. |
| 2011/0043927 A1 | 2/2011 | Sudoh |
| 2011/0051260 A1 | 3/2011 | Nakayama et al. |
| 2011/0069402 A1 | 3/2011 | Sudoh |
| 2011/0080654 A1* | 4/2011 | Okumura ............ G02B 15/163 359/691 |
| 2011/0222169 A1 | 9/2011 | Sudoh |
| 2011/0228408 A1 | 9/2011 | Sudoh |
| 2012/0127586 A1 | 5/2012 | Sudoh |
| 2014/0293457 A1 | 10/2014 | Sudoh |
| 2015/0043087 A1 | 2/2015 | Sudoh |
| 2015/0070780 A1 | 3/2015 | Sudoh |
| 2015/0130961 A1 | 5/2015 | Sudoh |
| 2016/0062091 A1* | 3/2016 | Wada ............... G02B 15/173 348/240.3 |

FOREIGN PATENT DOCUMENTS

| | | |
|---|---|---|
| CN | 105938239 | 9/2016 |
| JP | 59-142511 | 8/1984 |
| JP | 2-040606 | 2/1990 |
| JP | 07-306360 | 11/1995 |
| JP | 8-234098 | 9/1996 |
| JP | 2013-250330 | 12/2013 |
| JP | 2014-153543 | 8/2014 |

OTHER PUBLICATIONS

U.S. Appl. No. 14/584,167, filed Dec. 29, 2014.
U.S. Appl. No. 14/572,973, filed Dec. 17, 2014.
U.S. Appl. No. 14/819,832, filed Aug. 6, 2015, Ohashi, et al.
U.S. Appl. No. 14/819,832, filed Aug. 6, 2015.
Office Action dated May 22, 2017 in Chinese Patent Office for Chinese Patent Application No. 201510594310.5.

\* cited by examiner

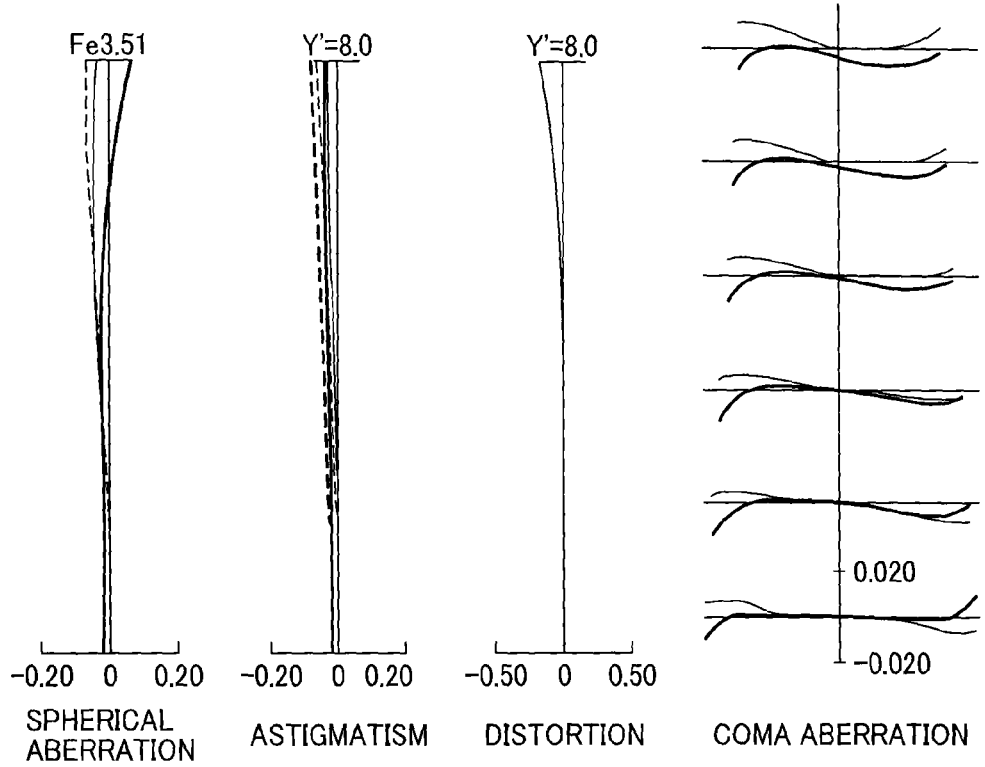
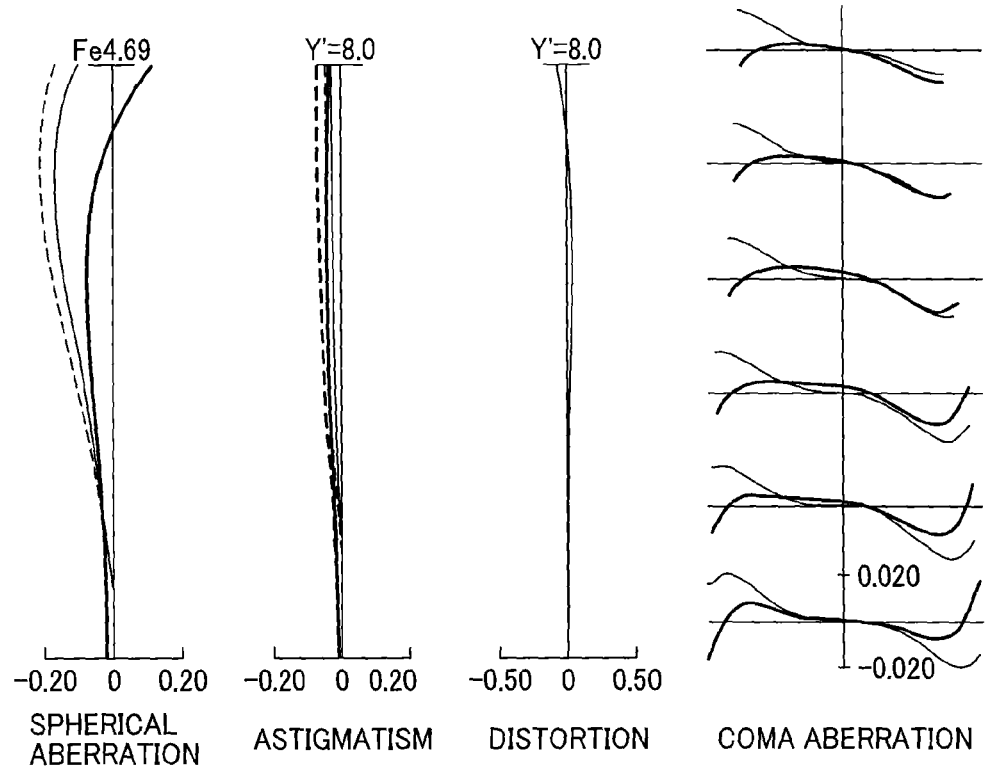

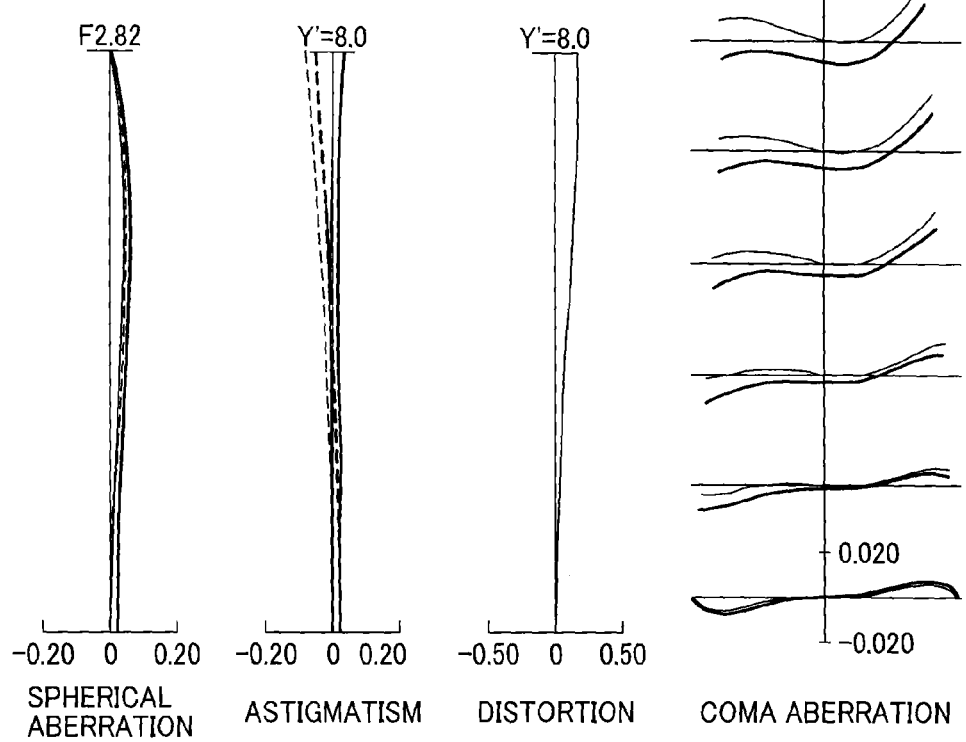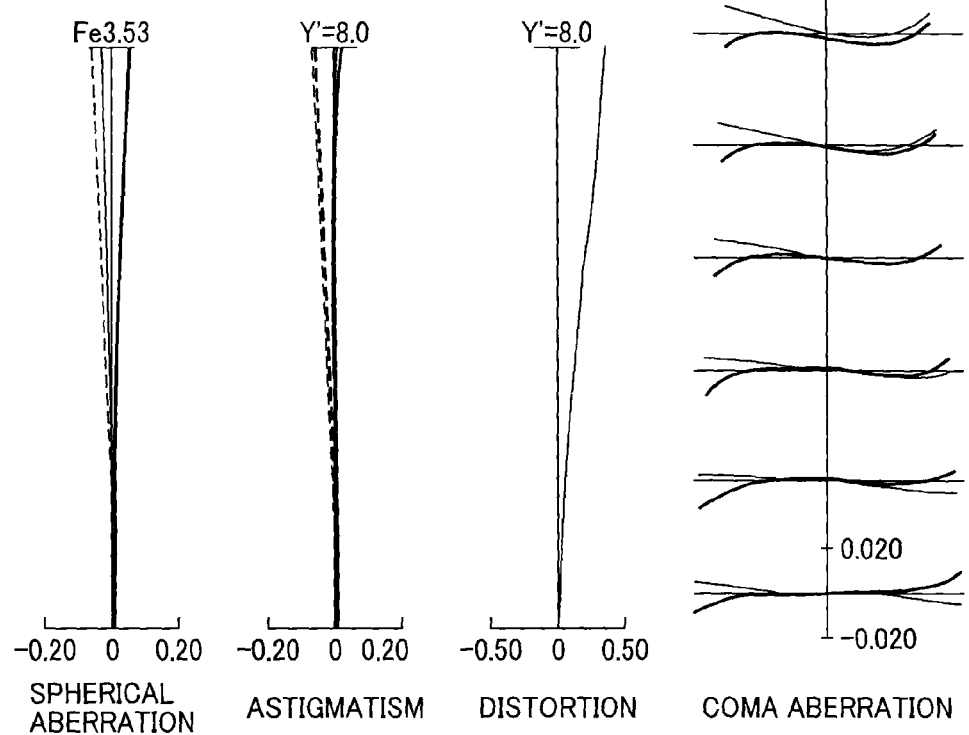

IMAGE FORMING LENS AND IMAGE CAPTURING DEVICE

CROSS-REFERENCE TO RELATED APPLICATIONS

This patent application is based on and claims priority pursuant to 35 U.S.C. §119(a) to Japanese Patent Application Nos. 2014-189093, filed on Sep. 17, 2014 and 2014-189451, filed on Sep. 17, 2014 in the Japan Patent Office, the entire disclosure of which is hereby incorporated by reference herein.

BACKGROUND

Technical Field

The present invention relates to an image forming lens and an image capturing device.

Description of the Related Art

A so-called "industrial camera" is widely put into practical use, and for example, an image input device for machine vision, etc. are developed.

For an image forming lens used in the image input device for machine vision, it is important to be capable of forming a high-definition image of an object to be captured for image inputting (also referred to as a "work"), and providing high performance while favorably correcting various aberrations is demanded.

Additionally, in the case where a "working distance" to the work is long, the image forming lens is also required to be a "lens with a large aperture" so as to form a bright image.

SUMMARY

An image forming lens is formed by sequentially arranging, from an object side to an image side, a first lens group having positive refractive power, an aperture stop, and a second lens group having positive or negative refractive power. The first lens group is formed by sequentially arranging, from the object side to the image side, a first positive lens, a second positive lens, a negative lens, and a third positive lens, and the second lens group is formed by sequentially arranging a negative lens group and a positive lens group from the object side to the image side. The image forming lens satisfies a conditional expression:

$0.15 < D1a/D1 < 0.50$, where $D1a$ is an air space between the first positive lens and the second positive lens in the first lens group, and $D1$ is a distance on an optical axis from an object-side lens surface of the first positive lens to an image-side lens surface of the third positive lens in the first lens group.

An image forming lens is formed by sequentially arranging, from an object side to an image side, a first lens group having positive refractive power, an aperture stop, and a second lens group having positive or negative refractive power. The first lens group is formed by sequentially arranging, from the object side to the image side, a first positive lens, a second positive lens, a negative lens, and a third positive lens, and the second lens group is formed by sequentially arranging a negative lens group and a positive lens group from the object side to the image side. The second lens group is fixed relative to an image surface and the first lens group is moved integrally to the object side when focusing is performed from an infinite distance object to a short distance object. The image forming lens satisfies a conditional expression:

$0.50 < f1/f < 0.90$, where $f1$ is a focal length of the first lens group, and $f$ is a focal length of an entire system in a state that focusing is performed on the infinite distance object.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 6 is a diagram illustrating aberrations of the image forming lens according to the first example in a state that focusing is performed on an object with an imaging magnification of −0.15 times;

FIG. 7 is a diagram illustrating aberrations of the image forming lens according to the first example in a state that focusing is performed on an object with an imaging magnification of −0.3 times;

FIG. 14 is a diagram illustrating aberrations of the image forming lens according to the fourth example in a state that focusing is performed on an infinite distance object;

FIG. 15 is a diagram illustrating aberrations of the image forming lens according to the fourth example in a state that focusing is performed on an object with an imaging magnification of −0.15 times;

Figure 1:
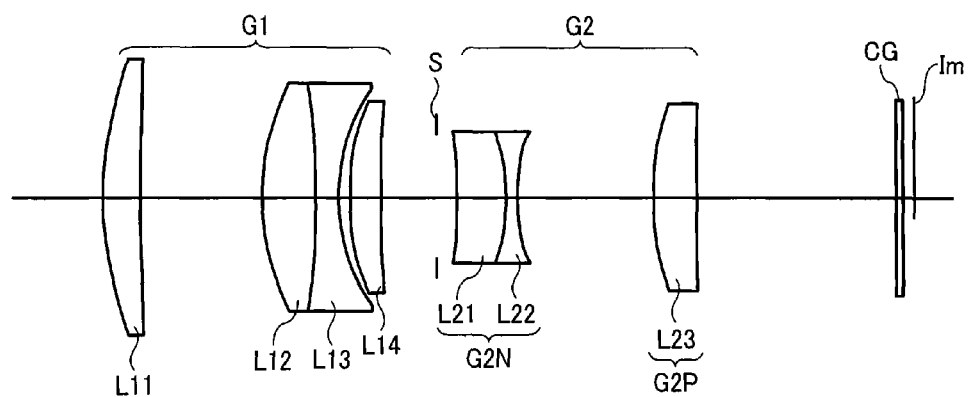
FIG. 1 is a diagram illustrating an image forming lens according to a first example.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

FIGS. 1 to 4 illustrate four working examples of an image forming lenses. These working examples correspond to concrete first to fourth examples described later in this order.

In FIGS. 1 to 4, a left side of the drawing is defined as an "object side", and a right side of the drawing is defined as an "image side".

FIGS. 1 to 4 are diagrams illustrating lens configurations in a state that an image forming lens is "focused on infinity".

Note that same reference sings are used in FIGS. 1 to 4 to avoid complication.

In FIGS. 1 to 4, a reference sign G1 indicates a "first lens group", a reference sign G2 a "second lens group", and a reference sign S an "aperture stop" respectively.

Further, a reference sign Im indicates an "image surface".

The image forming lenses according to these working examples are assumed to be used in the case of "capturing an image of a formed image with an image sensor" and a reference sign CG indicates a "cover glass of the image sensor" in FIGS. 1 to 4.

The cover glass CG is formed like a "parallel flat plate", and a light receiving surface of the image sensor coincides with the image surface Im.

The cover glass CG has a function to shield and protect the light receiving surface of the image sensor, and further can have various kinds of filtering functions such as an infrared cut filter.

The first lens group G1 has "positive refractive power", and the second lens group G2 has "positive or negative refractive power".

Therefore, the image forming lens according to the working examples illustrated in FIGS. 1 to 4 is formed by sequentially arranging, from the object side to the image side, the first lens group G1 having positive refractive power, the aperture stop S, and the second lens group G2 having positive or negative refractive power.

The first lens group G1 is formed by sequentially arranging, from the object side to the image side, a first positive lens L11, a second positive lens L12, a negative lens L13, and a third positive lens L14.

The second lens group is formed by sequentially arranging a negative lens group G2N and a positive lens group G2P from the object side to the image side.

In the image forming lens according to the working examples illustrated in FIGS. 1 to 4, the negative lens group G2N is formed of "two lenses L21, L22", and the positive lens group G2P is formed of "one lens L23".

The image forming lens having positive refractive power on the object side and negative refractive power on the image side is referred to as a "telephoto type".

In the "telephoto type image forming lens", it is generally assumed that "correcting aberrations is difficult" because the refractive power is not symmetrically distributed as the refractive power changes from positive to negative in a direction from the object side to the image side.

Particularly, it is assumed that "a spherical aberration, a coma aberration, and an axial chromatic aberration" generated due to an enlarged aperture are hardly corrected.

The inventor of the present invention found that such spherical aberration, coma aberration, and axial chromatic aberration generated due to the enlarged aperture can be sufficiently corrected by forming the first lens group by sequentially arranging a first positive lens, a second positive lens, a negative lens, and a third positive lens from the object side to the image side as described above.

The first lens group is an important group to correct the spherical aberration and coma aberration generated due to the enlarged aperture because an "on-axis luminous flux is thick" in the first lens group.

"Exchanging an aberration" between an "object-side surface of the first positive lens (first positive lens L11 in FIGS. 1 to 4) and an image-side surface of the negative lens (negative lens L13 in FIGS. 1 to 4)" in the first lens group contributes to correcting the spherical aberration and coma aberration.

To provide such contribution, "appropriately setting D1$a$ which is an air space between the first positive lens and the second positive lens" is important.

$$0.15 < D1a/D1 < 0.50 \qquad (1)$$

The above conditional expression (1) is a condition to specify an appropriate range of the air space D1$a$ with respect to a "distance D1 on an optical axis from an object-side lens surface of the first positive lens to an image-side lens surface of the third positive lens" in the first lens group.

Note that the distance "D1" is also referred to as a "thickness of the first lens group" hereinafter.

When a parameter of the conditional expression (1) is 0.50 or more, the air space D1$a$ becomes relatively excessively large with respect to the thickness of the first lens group D1, and a thickness and a distance occupied by the negative lens and the third positive lens become excessively small.

When the parameter of the conditional expression (1) is 0.15 or less, "correcting the aberration by exchanging the aberration between the object-side surface of the first positive lens and the image-side surface of the negative lens" becomes difficult.

Therefore, when the parameter is out of a range of conditional expression (1), "correcting the aberration inside the first lens group" becomes difficult.

By satisfying the conditional expression (1), it is possible to "correct the aberration correction inside the first lens group in a favorable manner", and the spherical aberration and coma aberration can be favorably corrected in an entire system.

Preferably, the image forming lens according to the present embodiment satisfies any one or more of following conditional expressions (2), (6), (7), (8), (9) in addition to the conditional expression (1) in the above-described configuration:

$$0.2 < D1b/D1 < 0.6 \quad (2),$$

$$0.25 < (R11-R32)/(R11+R32) < 0.45 \quad (6),$$

$$0.1 < (R41-R32)/(R41+R32) < 0.3 \quad (7),$$

$$0.1 < (R21-R32)/(R21+R32) < 0.3 \quad (8), \text{ and}$$

$$0.4 < D2a/D2 < 0.7 \quad (9).$$

The respective signs in parameters of these conditional expressions are defined as follows.

"D1b" is a distance between the object-side surface of the second positive lens and the image-side surface of the negative lens in the first lens group, and "D1" is a thickness of the first lens group.

"R11" is a curvature radius of the object-side surface of the first positive lens in the first lens group, and "R32" is a curvature radius of the image-side lens surface of the negative lens in the first lens group.

"R21" is a curvature radius of the object-side surface of the second positive lens in the first lens group, and "R41" is a curvature radius of an object-side surface of the third positive lens in the first lens group.

"D2a" is an air space between the negative lens group and the positive lens group in the second lens group.

"D2" is a distance on the optical axis from a lens surface closest to the object side in the negative lens group to a lens surface closest to the image side in the positive lens group in the second lens group. In the following, the distance D2 is also referred to as a "thickness of the second lens group".

The "object-side surface of the second positive lens and the image-side surface of the negative lens" in the first lens group also exchange an aberration, and it is important to appropriately set the distance D1b between these surfaces to correct the aberration inside the first lens group.

When a parameter of the conditional expression (2) is 0.6 or more, the distance between the object-side surface of the second positive lens and the image-side surface of the negative lens becomes "relatively large with respect to" the thickness of the first lens group, and thicknesses of the first positive lens and the third positive lens and the distance therebetween become excessively small.

When the parameter of the conditional expression (2) is 0.2 or less, contribution to "correcting the aberration by exchanging the aberration between the object-side surface of the second positive lens and the image-side surface of the negative lens" becomes small.

Therefore, when the parameter is out of a range of conditional expression (2), it is difficult to make aberration correction at the "object-side surface of the second positive lens and the image-side surface of the negative lens" effectively contribute to "correcting the aberration inside the first lens group".

By satisfying the conditional expression (2), aberration can be more favorably corrected inside the first lens group.

The object-side surface of the first positive lens and the image-side surface of the negative lens also exchange an aberration.

Such aberration exchange between the surfaces can be made to effectively contribute to correcting the aberration in the entire system by setting a magnitude relation between curvature radii of these surfaces so as to satisfy the conditional expression (6).

When the parameter is out of a range of conditional expression (6), the magnitude relation between the curvature radii of the object-side surface of the first positive lens and the image-side surface of the negative lens is unbalanced, and effective contribution to correcting the aberration in the entire system becomes difficult.

The image-side surface of the negative lens and the object-side surface of the third positive lens in the first lens group also contribute to correcting the aberration in the entire system by exchanging an aberration.

Such aberration exchange between the surfaces can be made to effectively contribute to correcting the aberration in the entire system by setting a magnitude relation between the curvature radii of these surfaces so as to satisfy the conditional expression (7).

When the parameter is out of a range of conditional expression (7), the magnitude relation between the curvature radii of the object-side surface of the third positive lens and the image-side surface of the negative lens is unbalanced, and effective contribution to correcting the aberration in the entire system becomes difficult.

The object-side surface of the second positive lens and the image-side surface of the negative lens in the first lens group also contribute to correcting the aberration in the entire system by exchanging an aberration.

Such aberration exchange between these surfaces can be made to effectively contribute to correcting the aberration in the entire system by setting a magnitude relation between the curvature radii of these surfaces so as to satisfy the conditional expression (8).

When the parameter is out of a range of conditional expression (8), the magnitude relation between the curvature radius of object-side surface of the second positive lens and the curvature radius of the image-side surface of the negative lens is unbalanced, and effective contribution to correcting the aberration in the entire system becomes difficult.

The above conditional expressions (1), (2), and (6) to (8) are the conditions related to the first lens group.

The conditional expression (9) relates to the second lens group, and specifies a preferable magnitude relation between the air space D2a between the negative lens group and the positive lens group in the second lens group and the thickness D2 of the second lens group.

When the parameter is within a range of the conditional expression (9), various kinds of aberrations can be easily corrected while reducing an incidence angle to the image surface.

The second lens group is formed of the "negative lens group" arranged on the object side and the "positive lens group" arranged on the image side.

The "negative lens group" may be formed of one negative lens, but may be formed of a plurality of lenses as well. In addition, the negative lens group may be formed of "two lenses including the positive lens and the negative lens".

According to the working examples illustrated in FIGS. 1 to 4, the negative lens group is formed of the two lenses including the positive lens L21 and the negative lens L22, and these two lenses L21, L22 are cemented.

The "positive lens group" can be formed of one positive lens L23 like the working examples illustrated in FIGS. 1 to 4, but not limited thereto, of course.

According to the working examples illustrated in FIGS. 1 to 4, the positive lens L12 and the negative lens L13 are cemented also in the first lens group. By cementing these two lenses L12, L13, the positive lens L12 and the negative lens L13 can be suppressed from being relatively eccentric.

In any of the above-described cases, preferably, at least one of the object-side two positive lenses (first positive lens, second positive lens) among the four lenses forming the first lens group is made of material quality satisfying following conditional expressions (3) to (5):

$$1.45 < n_d < 1.65 \quad (3),$$

$$60.0 < v_d < 95.0 \quad (4), \text{ and}$$

$$0.005 < P_{g,F} - (-0.001802 \times v_d + 0.6483) < 0.050 \quad (5).$$

"$n_d$", "$v_d$", and "$P_{g,F}$" respectively indicate a refractive index with respect to d line, an Abbe's number, and a partial dispersion ratio of material quality of a lens.

The partial dispersion ratio is defined as $P_{g,F} = (n_g - n_F)/(n_F - n_C)$ by the refractive indexes $n_g$, $n_F$, $n_C$ with respect to g line, F line, and C line of the material quality of the lens.

In the first positive lens and the second positive lens in the first lens group, "an axial marginal light beam passes at a high position". Therefore, these lenses are important to correct an axial chromatic aberration. The axial chromatic aberration can be easily and sufficiently corrected by using a "glass type having abnormal dispersibility" so as to satisfy the conditions (3) to (5).

Next, modified examples corresponding to respective first to fourth examples illustrated in FIGS. 1 to 4 will be described as a different embodiment.

Preferably, an image forming lens used in an image input device for machine vision has stable lens performance that is little varied due to focusing.

In the image forming lenses illustrated in FIGS. 1 to 4, a second lens group G2 is fixed relative to an image surface Im and a first lens group G1 is integrally moved to an object side when "focusing is performed from an infinite distance object to a short distance object".

In other words, a "positional relation between the second lens group G2 and the image surface Im" is kept constant, and a distance between the first lens group G1 and the second lens group G2 is changed at the time of focusing.

Further, when focusing is performed from the infinite distance object to the short distance object by simply "extending an entire portion" having positive refractive power on the object side, various kinds of aberrations are generated by change of an object distance to an object on which focusing is performed.

In other words, a telephoto type image forming lens has the lens performance which tends to be varied due to focusing.

The inventor of the present invention found that such "difficulty in correcting an aberration" and "variation of lens performance due to focusing" can be effectively reduced by devising a configuration of the image forming lens.

As described above, according to the image forming lens of the present embodiment, the first lens group having the positive refractive power is formed by sequentially arranging, from the object side to the image side, a first positive lens L11, a second positive lens L12, a negative lens L13, and a third positive lens L14.

The second lens group is formed by sequentially arranging a negative lens group and a positive lens group from the object side to the image side.

When focusing is performed from the infinite distance object to the short distance object, the second lens group is fixed relative to the image surface and the first lens group is moved to the object side.

According to this configuration, a moving amount of the first lens group due to focusing can be reduced by reducing a focal length f1 of the first lens group, and a mechanism for focusing can be simplified by fixing the second lens group relative to the image surface.

A conditional expression (11) is a condition to favorably correct various kinds of aberrations and effectively suppress the lens performance from being varied due to focusing by:

$$0.50 < f1/f < 0.90 \quad (11).$$

When a parameter of the conditional expression (11) is 0.5 or less, the positive refractive power of the first lens group becomes excessively large, a large aberration tends to be generated at the first lens group, and the aberration generated at the first lens group is enlarged by the second lens group. As a result, correcting the aberration in the entire system becomes difficult.

When the parameter of the conditional expression (11) becomes 0.9 or more, the entire system of the image forming lens tends to be increased in size in order to perform focusing up to high magnification.

More preferably, the parameter of the conditional expression (11) satisfies a following conditional expression (11A) having a condition slightly narrower than the conditional expression (11):

$$0.55 < f1/f < 0.75 \quad (11A).$$

An aperture stop disposed between the first and second lens groups can provide sufficient performance even in the case of being "moved integrally with the first lens group" and even in the case of being "fixed relative to the image surface" at the time of focusing.

However, in the case where the aperture stop is "fixed relative to the image surface together with the second lens group" when focusing is performed from the infinite distance object to the short distance object, a mechanism for focusing can be simplified and an extension amount of the lenses is easily secured.

Therefore, both downsizing the image forming lens and "focusing up to the high magnification" can be easily achieved.

Preferably, the image forming lens satisfies a following conditional expression (12) in addition to the conditional expression (11) in the above configuration in order to effectively suppress "variation of the lens performance due to focusing" in a relatively low magnification area such as an imaging magnification of about −0.15 times:

$$0.03 < M1/f < 0.10 \quad (12).$$

"M1" in the parameter of the conditional expression (12) is a moving amount of the first lens group when focusing is performed from the infinite distance object to an "object with the imaging magnification of −0.15 times", and "f" is a focal length of the entire system in a state that focusing is performed on the infinite distance object.

When a parameter of the conditional expression (12) is 0.03 or less, the refractive power of the first lens group becomes relatively excessively large with respect to the refractive power of the entire system, a large aberration tends to be generated at the first lens group, and the thus generated aberration is enlarged by the second lens group. As a result, favorably correcting the aberration in the entire system becomes difficult.

When the parameter of the conditional expression (12) exceeds 0.10, a "moving distance of the first lens group due to focusing" in the low magnification area becomes large, and the focusing mechanism is increased in size. As a result, the image forming lens tends to be increased in size.

Preferably, the parameter of the conditional expression (12) satisfies a following conditional expression (12A) having a condition slightly narrower than the conditional expression (12):

$$0.04 < M1/f < 0.08 \tag{12A}$$

Preferably, the image forming lens satisfies a following conditional expression (13) in addition to the conditional expression (11), or in addition to conditional expressions (11) and (12) in the above configuration in order to effectively suppress "variation of the lens performance due to focusing" in a relatively high magnification area such as an imaging magnification of about −0.3 times:

$$0.10 < M2/f < 0.15 \tag{13}$$

"M2" in the parameter of the conditional expression (13) is a moving amount of the first lens group when focusing is performed from the infinite distance object to an "object with the imaging magnification of −0.3 times", and "f" is the focal length of the entire system in the state that focusing is performed on the infinite distance object.

When a parameter of the conditional expression (13) is 0.10 or less, the refractive power of the first lens group becomes relatively excessively large with respect to the refractive power of the entire system, a large aberration tends to be generated at the first lens group, and the thus generated aberration is enlarged by the second lens group. As a result, favorably correcting the aberration in the entire system becomes difficult.

When the parameter of the conditional expression (13) exceeds 0.15, the "moving distance of the first lens group due to focusing" in the high magnification area becomes large, and the focusing mechanism is increased in size. As a result, the image forming lens tends to be increased in size.

When the conditional expressions (12) and (13) are satisfied in addition to the conditional expression (11), favorable focusing can be performed from the low magnification area having the imaging magnification of about −0.15 times to the high magnification area having the imaging magnification of about −0.3 times while suppressing variation of the lens performance.

Preferably, the image forming lens satisfies a following conditional expression (14) in addition to the conditional expression (11), or in addition to the conditional expression (11) and "at least one of the conditional expressions (12) and (13)":

$$0.4 < D2a/D2 < 0.7 \tag{14}$$

In the parameter of the conditional expression (14), "D2a" is an air space between the negative lens group and the positive lens group forming the second lens group, and "D2" is a distance on an optical axis from a "lens surface closest to the object side in the negative lens group to a lens surface closest to the image side in the positive lens group" in the second lens group.

In the following, the distance D2 is also referred to as a "thickness of the second lens group".

When the parameter is within a range of the conditional expression (14), various kinds of aberrations can be easily corrected while reducing an incidence angle to the image surface.

The second lens group is formed of the "negative lens group" arranged on the object side and the "positive lens group" arranged on the image side.

The "negative lens group" may be formed of one negative lens, but may also be formed of a plurality of lenses. In addition, the negative lens group may be formed of "two lenses including the positive lens and the negative lens".

According to the examples illustrated in FIGS. 1 to 4, the negative lens group is formed of two lenses including a positive lens L21 and a negative lens L22, and these two lenses L21, L22 are cemented.

The "positive lens group" may be formed of one positive lens L23 as illustrated in FIGS. 1 to 4, but not limited thereto, of course.

In any of the above-described cases, preferably, at least one of the object-side two positive lenses (first positive lens, second positive lens) out of the four lenses forming the first lens group is made of material quality satisfying following conditional expressions (15) to (17):

$$1.45 < n_d < 1.65 \tag{15},$$

$$60.0 < v_d < 95.0 \tag{16, and}$$

$$0.005 < P_{g,F} - (-0.001802 \times v_d + 0.6483) < 0.050 \tag{17}$$

"$n_d$", "$v_d$", and "$P_{g,F}$" respectively indicate a refractive index with respect to d line, an Abbe's number, and a partial dispersion ratio of the material quality of a lens.

The partial dispersion ratio is defined as $P_{g,F} = (n_g - n_F)/(n_F - n_C)$ by the refractive indexes $n_g$, $n_F$, $n_C$ with respect to g line, F line, and C line of the material quality of the lens.

In the first positive lens and the second positive lens in the first lens group, "an axial marginal light beam passes at a high position". Therefore, these lenses are important to correct an axial chromatic aberration. The axial chromatic aberration can be easily and sufficiently corrected by using a "glass type having abnormal dispersibility" satisfying the conditional expressions (15) to (17).

In all of the various cases described above, preferably, the image forming lens satisfies a following conditional expression (18):

$$0.2 < D1a/D1 < 0.5 \tag{18}$$

In the parameter, "D1a" is an air space between the first positive lens and the second positive lens, "D1" is a distance on an optical axis from an object-side surface of the first positive lens to an image-side surface of the third positive lens in the first lens group, and the distance is also referred to as a "thickness of the first lens group" in the following.

In the first lens group, the object-side surface of the first positive lens and the image-side surface of the negative lens exchanges an aberration.

Therefore, a spherical aberration and a coma aberration generated due to an enlarged aperture of the image forming lens can be easily and sufficiently corrected by appropriately setting the space (=D1a) between the first positive lens and the second positive lens.

When a parameter of the conditional expression (18) is 0.2 or less, correcting the aberration on the object-side surface of the first positive lens and the image-side surface of the negative lens between which the "aberration is exchanged" tends to be difficult, and correcting the aberration inside the first lens group tends to be difficult.

When the parameter of the conditional expression (18) is 0.5 or more, the space between the first positive lens and the second positive lens becomes large, and the thicknesses and distances of other lenses become small. In this case also, correcting the aberration inside the first lens group tends to be difficult.

The image forming lens used in an "image input device for machine vision" described above is considered to have a field angle of about 10 degrees as an almost telescopic lens in which a working distance can be easily secured and perspective influence is hardly received.

The conditional expressions (15) to (17) are effective to suppress a chromatic aberration from being generated in the image forming lens having such a field angle of about 10 degrees.

The image forming lens according to these embodiments may, of course, adopt one or more of special surfaces such as an aspheric surface and a diffractive surface, but all of the lens surfaces may be formed of spherical surfaces as well.

When the special surfaces such as the aspheric surface and the diffractive surface are not adopted, "high manufacturing cost" spent for a die for molding can be saved, for example, and particularly, it is economically advantageous at the time of small-lot production.

Further, preferably, all of the respective lenses constituting the image forming lens are made of "inorganic solid material". The lens made of organic material, "organic-inorganic hybrid material", etc. has a property largely varied by environmental conditions such as temperature and humidity.

When all of the lenses constituting the image forming lens are made of the "inorganic solid material", the image forming lens hardly receiving influence from change of the environmental conditions such as temperature and humidity can be provided.

Examples

In the following, the first to fourth examples will be described as the concrete examples of the image forming lenses according to the working examples illustrated in FIGS. 1 to 4.

The image forming lenses of the first to fourth examples are assumed to be used in an "image input device for machine vision", and are almost telescopic image forming lenses in which a working distance can be easily secured and perspective influence is hardly received.

The "working distance" is an operating distance and is a distance between an end of the lens and an object surface of a "work" which is a target to be imaged for image inputting.

As illustrated in FIGS. 1 to 4 in which the same reference signs are used, the image forming lens is formed by sequentially arranging the first lens group G1, the aperture stop S, and the second lens group G2 from the object side to the image side.

The first lens group G1 is formed by sequentially arranging four lenses from the object side to the image side in order of the first positive lens L11, the second positive lens L12, the negative lens L13, and the third positive lens L14.

In all of the first to fourth examples, the second positive lens L12 and the negative lens L13 are cemented.

The second lens group G2 arranged on the image side of the aperture stop S is formed by sequentially arranging the negative lens group G2N and the positive lens group G2P from the object side to the image side.

The negative lens group G2N is formed of the positive lens L21 and the negative lens L22, and in all of the first to fourth examples, the positive lens L21 and the negative lens L22 are cemented.

In all of the first to fourth examples, the positive lens group G2P is formed of one positive lens L23.

In all of the first to fourth examples, the image forming lens is formed of seven lenses, and all of the seven lenses are "spherical lenses" and made of "inorganic solid material".

In all of the first to fourth examples, a "maximum image height is 8.0 mm".

In the respective examples, the cover glass CG having the form of the parallel flat plate disposed on an image surface side of the second lens group G2 is arranged such that an image-side surface thereof is located at a position about 1.0 mm from an image surface Im on the object side, but not limited thereto, of course.

Additionally, in all of the image forming lenses in the first to fourth examples, the first lens group G1 is moved to the object side and the second lens group G2 is fixed relative to the image surface Im when focusing is performed from the infinite distance object to the short distance object.

The aperture stop S is also fixed relative to the image surface Im at the time of focusing.

The aperture stop S may be integrally moved with the first lens group G1 at the time of focusing, but a moving mechanism for focusing can be simplified and an extension amount of the first lens group can be easily secured by fixing the aperture stop.

The signs in the respective examples are defined as follows.

f: focal length in entire system (focal length in a state that focusing is performed on an infinite distance object)
F: F number
2ω: field angle (field angle in a state that focusing is performed on infinity)
R: curvature radius
D: distance between surfaces
N: refractive index ("$n_d$" in the above description)
ν: Abbe's number ("$ν_d$" in the above description)
φ: effective diameter of light beam The unit of a length dimension is "mm", unless otherwise specifically noted.

The first example described first is a concrete example of the image forming lens illustrated in FIG. 1.

First Example f=75.0 mm, F=2.83, 2ω=12.2 degrees
Data of the first example is shown in TABLE 1.

TABLE 1

| | R | D | N | ν | φ | Glass |
|---|---|---|---|---|---|---|
| 1 | 36.662 | 3.80 | 1.61800 | 63.33 | 26.8 | S-PHM52(OHARA) |
| 2 | 25.624 | 12.26 | | | 26.4 | |
| 3 | 26.430 | 5.44 | 1.49700 | 81.54 | 22.0 | S-FPL51(OHARA) |
| 4 | −64.049 | 2.16 | 1.60342 | 38.03 | 20.9 | S-TIM5(OHARA) |
| 5 | 18.619 | 1.22 | | | 18.5 | |
| 6 | 26.042 | 3.12 | 1.78800 | 47.37 | 18.5 | S-LAH64(OHARA) |
| 7 | 89.619 | D7 | | | 17.8 | |
| 8 | STOP | 2.00 | | | 12.8 | |
| 9 | −51.664 | 4.98 | 1.84666 | 23.78 | 12.4 | S-TIH53(OHARA) |
| 10 | −17.785 | 1.00 | 1.62004 | 36.26 | 12.2 | S-TIM2(OHARA) |
| 11 | 17.447 | 13.54 | | | 11.7 | |
| 12 | 27.589 | 4.50 | 1.67790 | 55.34 | 17.9 | S-LAL12(OHARA) |
| 13 | −395.881 | 19.76 | | | 17.8 | |
| 14 | ∞ | 0.75 | 1.51633 | 64.14 | | Filter, etc. |
| 15 | ∞ | 1.00 | | | | |

In TABLE 1, values in a left column are surface numbers counted from the object side.

In the above data, "stop" indicates the "aperture stop", of course.

<Variable Distance>

A variable distance is a distance between the first lens group and the aperture stop ("D7" in the above data).

"D7" shows values in the following states that: focusing is performed on the infinite distance object (indicated as Inf); focusing is performed on an object (work) with an imaging magnification of −0.15 times (indicated as ×0.15); and focusing is performed on an object with an imaging magnification of −0.3 times (indicated as ×0.3).

The same is applied to following other examples.

Data of the variable distance is shown in TABLE 2.

TABLE 2

|  | Inf. | ×0.15 | ×0.30 |
| --- | --- | --- | --- |
| D7 | 5.63850 | 10.25520 | 14.87189 |

<Parameter Values in Conditional Expressions>

The parameter values in the respective conditional expressions (1) to (9) according to the first example are shown in TABLE 3A.

TABLE 3A

|  |  | D1a/D1 | 0.44 |
| --- | --- | --- | --- |
|  |  | D1b/D1 | 0.27 |
| L1 |  | $N_d$ | 1.61800 |
|  |  | $v_d$ | 63.33 |
|  |  | $P_{g,F} - (-0.001802 \times vd + 0.6483)$ | 0.01 |
| L2 |  | $N_d$ | 1.49700 |
|  |  | $v_d$ | 81.54 |
|  |  | $P_{g,F} - (-0.001802 \times vd + 0.6483)$ | 0.036 |
|  |  | (R11 − R32)/(R11 + R32) | 0.33 |
|  |  | (R41 − R32)/(R41 + R32) | 0.17 |
|  |  | (R21 − R32)/(R21 + R32) | 0.17 |
|  |  | D2a/D2 | 0.56 |

Parameter values in the respective conditional expressions (11) to (18) according to the first example are shown in TABLE 3B.

TABLE 3B

|  |  | f1/f | 0.64 |
| --- | --- | --- | --- |
|  |  | M1/f | 0.06 |
|  |  | M2/f | 0.12 |
|  |  | D2a/D2 | 0.56 |
| L1 |  | $N_d$ | 1.61800 |
|  |  | $v_d$ | 63.33 |
|  |  | $P_{g,F} - (-0.001802 \times vd + 0.6483)$ | 0.010 |
| L2 |  | $N_d$ | 1.49700 |
|  |  | $v_d$ | 81.54 |
|  |  | $P_{g,F} - (-0.001802 \times vd + 0.6483)$ | 0.036 |
|  |  | D1a/D1 | 0.44 |

"L1" in TABLE 3A and TABLE 3B indicates a first positive lens L11 in the first lens group, and "L2" indicates a second positive lens L12 in the first lens group. The same is applied to the following examples.

Figure 2:
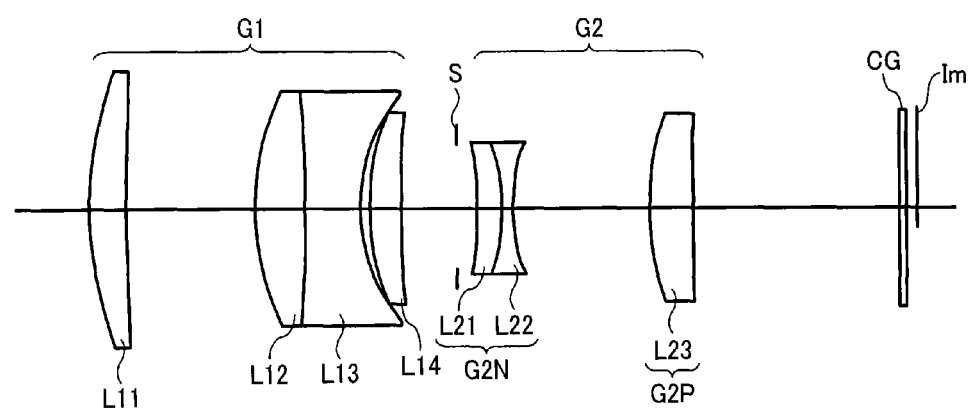
FIG. 2 is a diagram illustrating an image forming lens according to a second example.

The second example described next is a concrete example of the image forming lens illustrated in FIG. 2.

Second Example f=75.0 mm, F=2.80, 2ω=12.2 degrees

Data of the second example is shown in TABLE 4.

TABLE 4

|  | R | D | N | ν | φ | Glass |
| --- | --- | --- | --- | --- | --- | --- |
| 1 | 41.714 | 3.47 | 1.60300 | 65.44 | 26.8 | S-PHM53(OHARA) |
| 2 | 196.226 | 12.81 |  |  | 26.5 |  |
| 3 | 26.282 | 5.22 | 1.49700 | 81.54 | 22.9 | S-FPL51(OHARA) |
| 4 | −116.267 | 5.50 | 1.62004 | 36.26 | 22.0 | S-TIM2(OHARA) |
| 5 | 18.579 | 0.71 |  |  | 18.5 |  |
| 6 | 24.308 | 3.31 | 1.78800 | 47.37 | 18.5 | S-LAH64(OHARA) |
| 7 | 125.741 | D7 |  |  | 17.8 |  |
| 8 | STOP | 2.63 |  |  | 12.8 |  |
| 9 | −44.376 | 1.00 | 1.84666 | 23.78 | 12.3 | S-TIH53(OHARA) |
| 10 | −16.332 | 13.38 | 1.62004 | 36.26 | 12.3 | S-TIM2(OHARA) |
| 11 | 16.774 | 4.50 |  |  | 11.7 |  |
| 12 | 27.509 | 20.36 | 1.65100 | 56.16 | 17.8 | S-LAL12(OHARA) |
| 13 | −262.599 | 0.75 |  |  | 17.8 |  |
| 14 | ∞ | 1.00 | 1.51633 | 64.14 |  | Filter, etc. |
| 15 | ∞ | 1.00 |  |  |  |  |

<Variable Distance>

Data of a variable distance is shown in TABLE 5.

TABLE 5

|  | Inf. | ×0.15 | ×0.30 |
| --- | --- | --- | --- |
| D7 | 5.5396 | 9.73238 | 13.92515 |

<Parameter Values in Conditional Expressions>

The parameter values in the respective conditional expressions (1) to (9) according to the second example are shown in TABLE 6A.

TABLE 6A

|  |  | D1a/D1 | 0.41 |
| --- | --- | --- | --- |
|  |  | D1b/D1 | 0.35 |
| L1 |  | $N_d$ | 1.60300 |
|  |  | $v_d$ | 65.44 |
|  |  | $P_{g,F} - (-0.001802 \times vd + 0.6483)$ | 0.01 |
| L2 |  | $N_d$ | 1.49700 |
|  |  | $v_d$ | 81.54 |
|  |  | $P_{g,F} - (-0.001802 \times vd + 0.6483)$ | 0.036 |
|  |  | (R11 − R32)/(R11 + R32) | 0.38 |
|  |  | (R41 − R32)/(R41 + R32) | 0.13 |
|  |  | (R21 − R32)/(R21 + R32) | 0.17 |
|  |  | D2a/D2 | 0.62 |

Parameter values in the respective conditional expressions (11) to (18) according to the second example are shown in TABLE 6B.

TABLE 6B

|  |  | f1/f | 0.61 |
| --- | --- | --- | --- |
|  |  | M1/f | 0.06 |
|  |  | M2/f | 0.11 |
|  |  | D2a/D2 | 0.62 |
| L1 |  | $N_d$ | 1.60300 |
|  |  | $v_d$ | 65.44 |
|  |  | $P_{g,F} - (-0.001802 \times vd + 0.6483)$ | 0.010 |
| L2 |  | $N_d$ | 1.49700 |
|  |  | $v_d$ | 81.54 |
|  |  | $P_{g,F} - (-0.001802 \times vd + 0.6483)$ | 0.036 |
|  |  | D1a/D1 | 0.41 |

Figure 3:
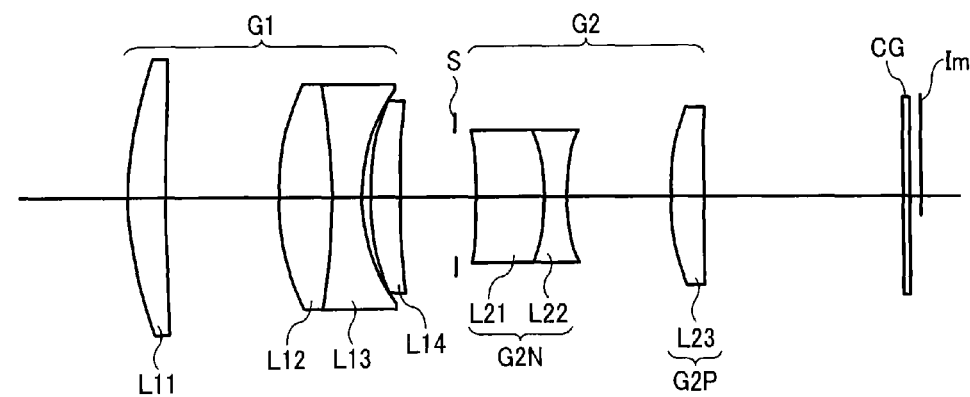
FIG. 3 is a diagram illustrating an image forming lens according to a third example.

The third example described next is a concrete example of the image forming lens illustrated in FIG. 3.

Third Example f=75.0 mm, F=2.85, 2ω=12.2 degrees
Data of the third example is shown in TABLE 7.

TABLE 7

|    | R        | D     | N       | ν     | φ    | Glass         |
|----|----------|-------|---------|-------|------|---------------|
| 1  | 37.839   | 3.82  | 1.61800 | 63.33 | 26.8 | S-PHM52(OHARA)|
| 2  | 272.474  | 11.49 |         |       | 26.5 |               |
| 3  | 27.476   | 5.44  | 1.49700 | 81.54 | 22.2 | S-FPL51(OHARA)|
| 4  | −70.667  | 3.09  | 1.60342 | 38.03 | 21.0 | S-TIM5(OHARA) |
| 5  | 18.755   | 0.88  |         |       | 18.4 |               |
| 6  | 26.305   | 3.06  | 1.78800 | 47.37 | 18.4 | S-LAH64(OHARA)|
| 7  | 77.619   | D7    |         |       | 17.8 |               |
| 8  | STOP     | 2.00  |         |       | 12.8 |               |
| 9  | −56.871  | 6.95  | 1.84666 | 23.78 | 12.4 | S-TIH53(OHARA)|
| 10 | −18.512  | 2.13  | 1.62004 | 36.26 | 12.1 | S-TIM2(OHARA) |
| 11 | 17.140   | 10.50 |         |       | 11.7 |               |
| 12 | 26.847   | 3.41  | 1.67790 | 55.34 | 16.8 | S-LAL12(OHARA)|
| 13 | −414.636 | 20.19 |         |       | 16.8 |               |
| 14 | ∞        | 0.75  | 1.51633 | 64.14 |      | Filter, etc.  |
| 15 | ∞        | 1.00  |         |       |      |               |

<Variable Distance>
Data of a variable distance is shown in TABLE 8.

TABLE 8

|    | Inf.   | ×0.15    | ×0.30    |
|----|--------|----------|----------|
| D7 | 5.5396 | 10.56583 | 15.59206 |

<Parameter Values in Conditional Expressions>

The parameter values in the respective conditional expressions (1) to (9) according to the third example are shown in TABLE 9A.

TABLE 9A

|    |                                             |        |
|----|---------------------------------------------|--------|
|    | D1a/D1                                      | 0.41   |
|    | D1b/D1                                      | 0.31   |
| L1 | $N_d$                                       | 1.61800|
|    | $v_d$                                       | 63.33  |
|    | $P_{g,F}$ − (−0.001802 × vd + 0.6483)       | 0.01   |
| L2 | $N_d$                                       | 1.49700|
|    | $v_d$                                       | 81.54  |
|    | $P_{g,F}$ − (−0.001802 × vd + 0.6483)       | 0.036  |
|    | (R11 − R32)/(R11 + R32)                     | 0.34   |
|    | (R41 − R32)/(R41 + R32)                     | 0.17   |
|    | (R21 − R32)/(R21 + R32)                     | 0.19   |
|    | D2a/D2                                      | 0.46   |

Parameter values in the respective conditional expressions (11) to (18) according to the third example are shown in TABLE 9B.

TABLE 9B

|    |                                             |        |
|----|---------------------------------------------|--------|
|    | f1/f                                        | 0.67   |
|    | M1/f                                        | 0.07   |
|    | M2/f                                        | 0.13   |
|    | D2a/D2                                      | 0.46   |
| L1 | $N_d$                                       | 1.61800|
|    | $v_d$                                       | 63.33  |
|    | $P_{g,F}$ − (−0.001802 × vd + 0.6483)       | 0.010  |
| L2 | $N_d$                                       | 1.49700|
|    | $v_d$                                       | 81.54  |
|    | $P_{g,F}$ − (−0.001802 × vd + 0.6483)       | 0.036  |
|    | D1a/D1                                      | 0.41   |

Figure 4:
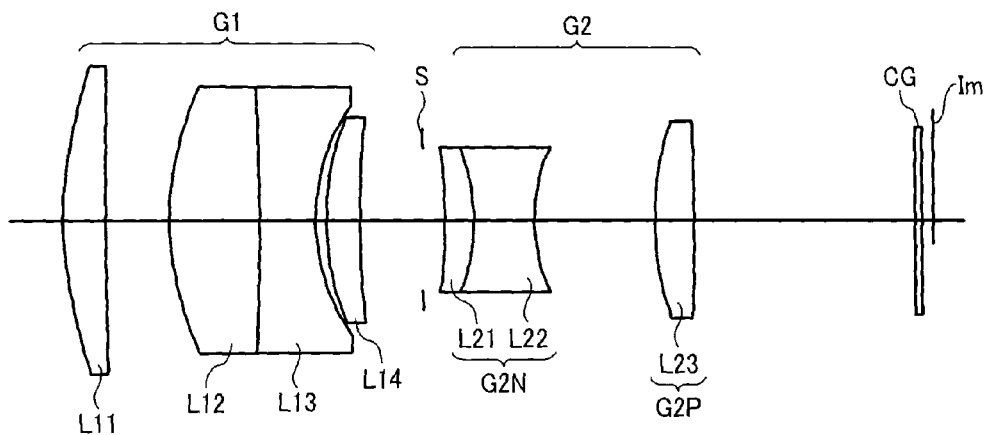
FIG. 4 is a diagram illustrating an image forming lens according to a fourth example.

The fourth example described finally is a concrete example of the image forming lens illustrated in FIG. 4.

Fourth Example f=75.0 mm, F=2.82, 2ω=12.2 degrees
Data of the fourth example is shown in TABLE 10.

TABLE 10

|    | R        | D     | N       | ν     | φ    | Glass         |
|----|----------|-------|---------|-------|------|---------------|
| 1  | 41.398   | 3.75  | 1.59522 | 67.73 | 26.8 | S-FPM2(OHARA) |
| 2  | 524.486  | 5.59  |         |       | 26.5 |               |
| 3  | 27.334   | 8.21  | 1.49700 | 81.54 | 24.1 | S-FPL51(OHARA)|
| 4  | −179.356 | 4.98  | 1.62004 | 36.26 | 21.6 | S-TIM2(OHARA) |
| 5  | 18.315   | 0.97  |         |       | 18.4 |               |
| 6  | 26.807   | 3.04  | 1.78800 | 47.37 | 18.4 | S-LAH64(OHARA)|
| 7  | 80.984   | D7    |         |       | 17.8 |               |
| 8  | STOP     | 2.00  |         |       | 12.8 |               |
| 9  | −45.532  | 2.57  | 1.84666 | 23.78 | 12.4 | S-TIH53(OHARA)|
| 10 | −17.838  | 5.50  | 1.65100 | 36.26 | 12.4 | S-TIM2(OHARA) |
| 11 | 17.514   | 10.63 |         |       | 11.7 |               |
| 12 | 27.885   | 3.58  | 1.51633 | 56.16 | 17.1 | S-LAL54(OHARA)|
| 13 | −130.335 | 19.74 |         |       | 17.1 |               |
| 14 | ∞        | 0.75  | 1.51633 | 64.14 |      | Filter, etc.  |
| 15 | ∞        | 1.00  |         |       |      |               |

<Variable Distance>
Data of a variable distance is shown in TABLE 11.

TABLE 11

|    | Inf.  | ×0.15    | ×0.30    |
|----|-------|----------|----------|
| D7 | 5.669 | 10.57432 | 15.47963 |

<Parameter Values in Conditional Expressions>

The parameter values in the respective conditional expressions (1) to (9) according to the fourth example are shown in TABLE 12A.

TABLE 12A

|    |                                             |        |
|----|---------------------------------------------|--------|
|    | D1a/D1                                      | 0.21   |
|    | D1b/D1                                      | 0.50   |
| L1 | $N_d$                                       | 1.59522|
|    | $v_d$                                       | 67.73  |
|    | $P_{g,F}$ − (−0.001802 × vd + 0.6483)       | 0.02   |
| L2 | $N_d$                                       | 1.49700|
|    | $v_d$                                       | 81.54  |
|    | $P_{g,F}$ − (−0.001802 × vd + 0.6483)       | 0.036  |
|    | (R11 − R32)/(R11 + R32)                     | 0.39   |
|    | (R41 − R32)/(R41 + R32)                     | 0.19   |
|    | (R21 − R32)/(R21 + R32)                     | 0.20   |
|    | D2a/D2                                      | 0.48   |

The parameter values in the respective conditional expressions (11) to (18) according to the fourth example are shown in TABLE 12B.

TABLE 12B

|    |                                             |        |
|----|---------------------------------------------|--------|
|    | f1/f                                        | 0.66   |
|    | M1/f                                        | 0.07   |
|    | M2/f                                        | 0.13   |
|    | D2a/D2                                      | 0.48   |
| L1 | $N_d$                                       | 1.59522|
|    | $v_d$                                       | 67.73  |
|    | $P_{g,F}$ − (−0.001802 × vd + 0.6483)       | 0.018  |
| L2 | Na                                          | 1.49700|
|    | $v_d$                                       | 81.54  |
|    | $P_{g,F}$ − (−0.001802 × vd + 0.6483)       | 0.036  |
|    | D1a/D1                                      | 0.21   |

Figure 5:
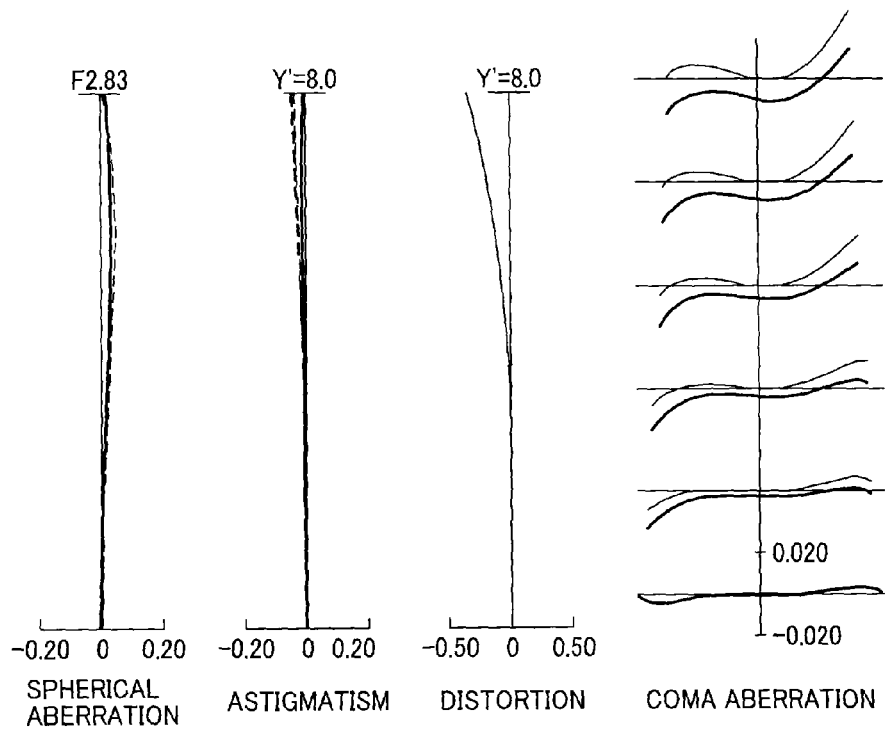
FIG. 5 is a diagram illustrating aberrations of the image forming lens according to the first example in a state that focusing is performed on an infinite distance object.

FIGS. 5 to 7 are diagrams illustrating aberration curves of the image forming lens according to the first example.

FIG. 5 is the diagram illustrating the aberration curves of the image forming lens according to the first example in a state that focusing is performed on an infinite distance object.

FIG. 6 is the diagram illustrating aberrations in a state that focusing is performed on an "object with the imaging magnification of −0.15 times", and FIG. 7 is the diagram illustrating aberrations in a state that focusing is performed on an "object with the imaging magnification −0.3 times".

Figure 8:
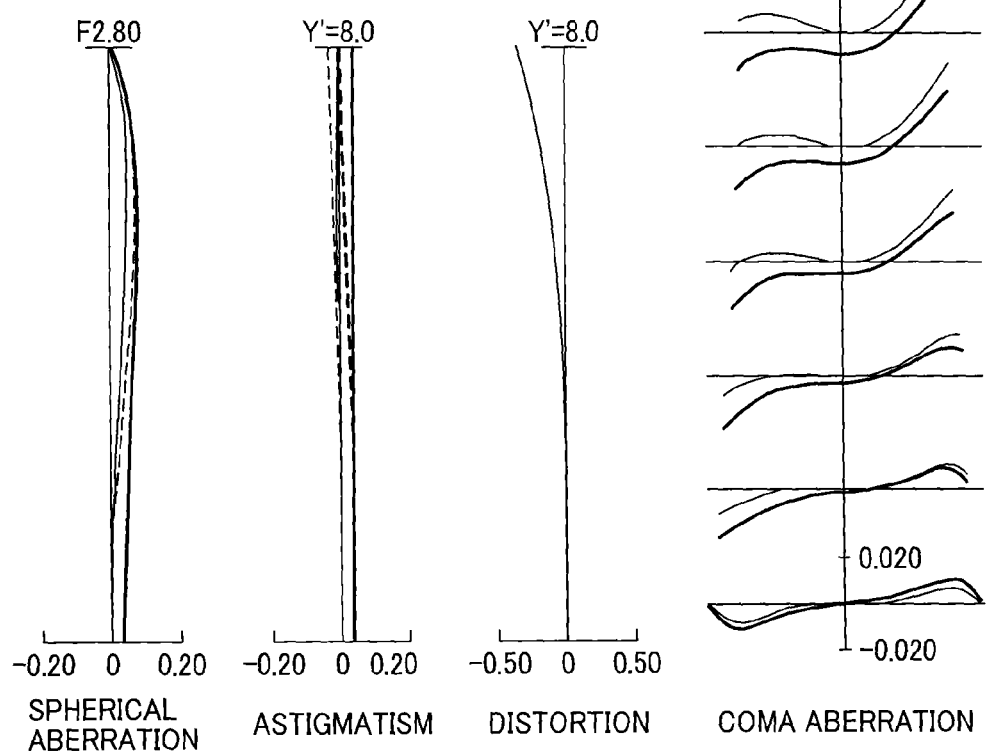
FIG. 8 is a diagram illustrating aberrations of the image forming lens according to the second example in a state that focusing is performed on an infinite distance object.
Figure 9:
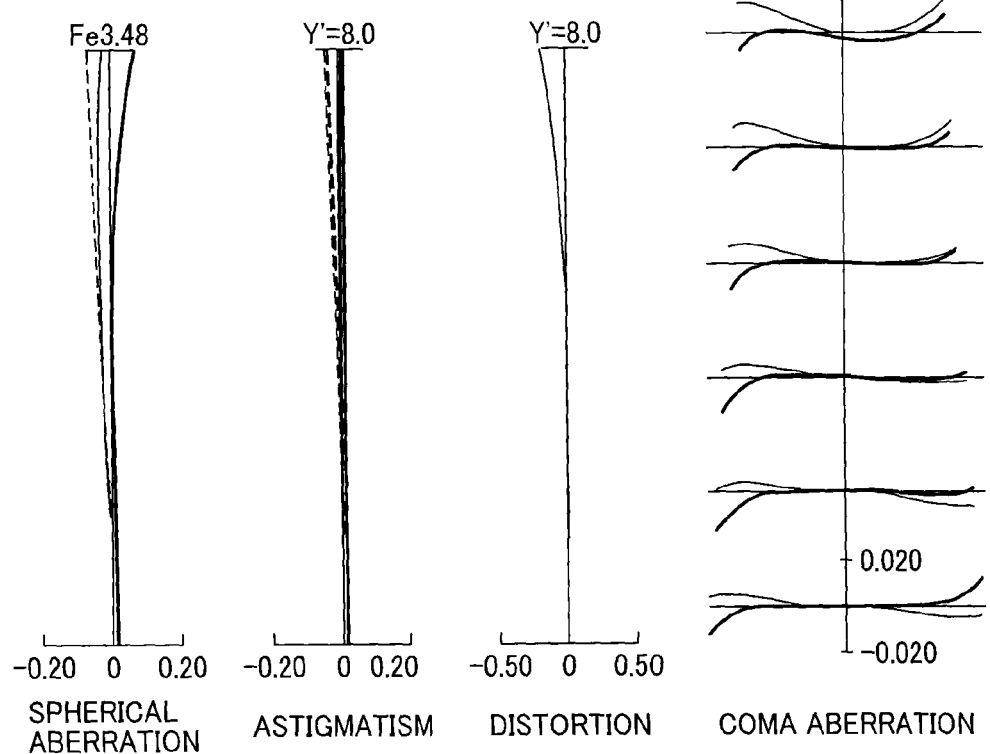
FIG. 9 is a diagram illustrating aberrations of the image forming lens according to the second example in a state that focusing is performed on an object with an imaging magnification of −0.15 times.
Figure 10:
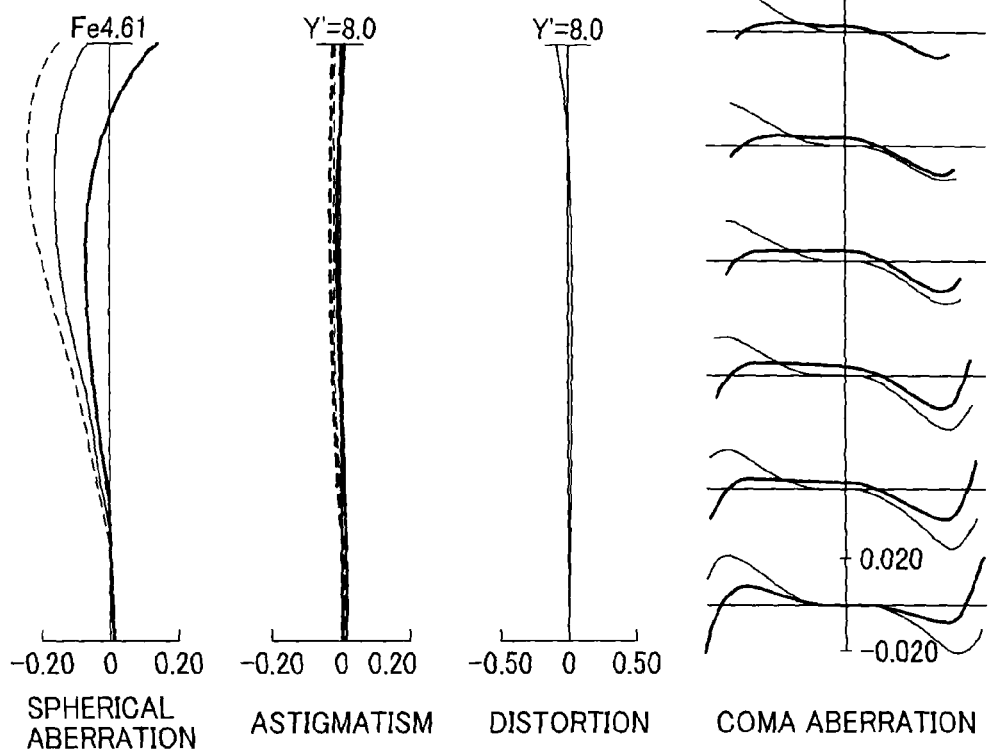
FIG. 10 is a diagram illustrating aberrations of the image forming lens according to the second example in a state that focusing is performed on an object with an imaging magnification of −0.3 times.

FIGS. 8 to 10 are diagrams illustrating aberration curves of the image forming lens according to the second example.

FIG. 8 is the diagram illustrating the aberration curves of the image forming lens according to the second example in a state that "focusing is performed on an infinite distance object".

FIG. 9 is the diagram illustrating aberrations in a state that focusing is performed on an "object with an imaging magnification of −0.15 times", and FIG. 10 is the diagram illustrating aberrations in a state that focusing is performed on an "object with an imaging magnification −0.3 times".

Figure 11:
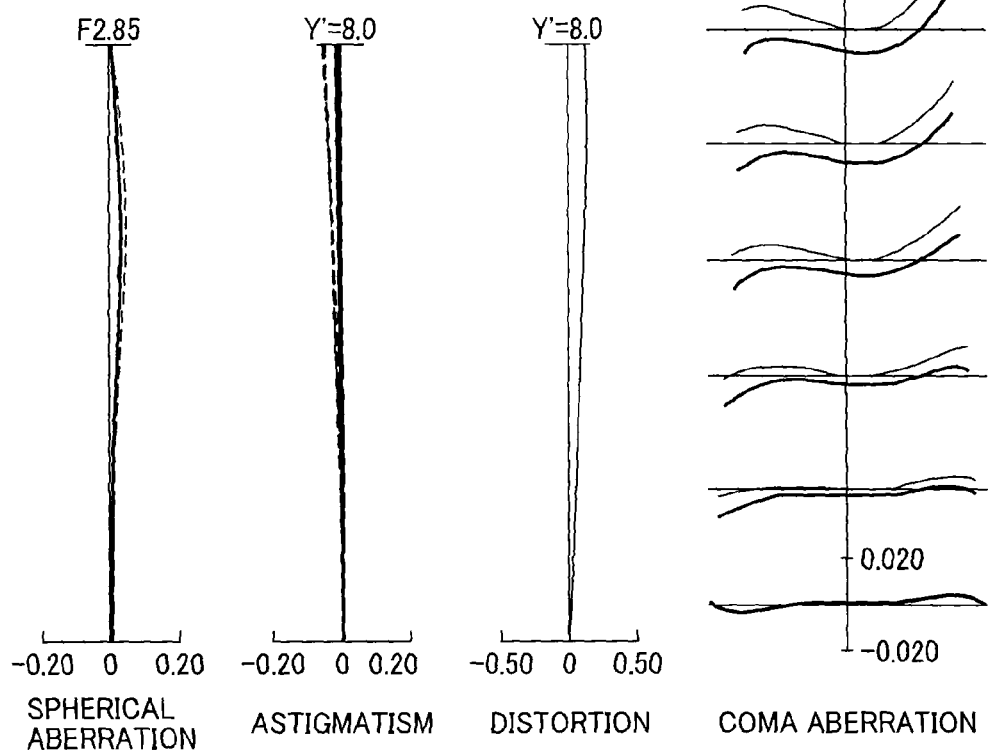
FIG. 11 is a diagram illustrating aberrations of the image forming lens according to the third example in a state that focusing is performed on an infinite distance object.
Figure 12:
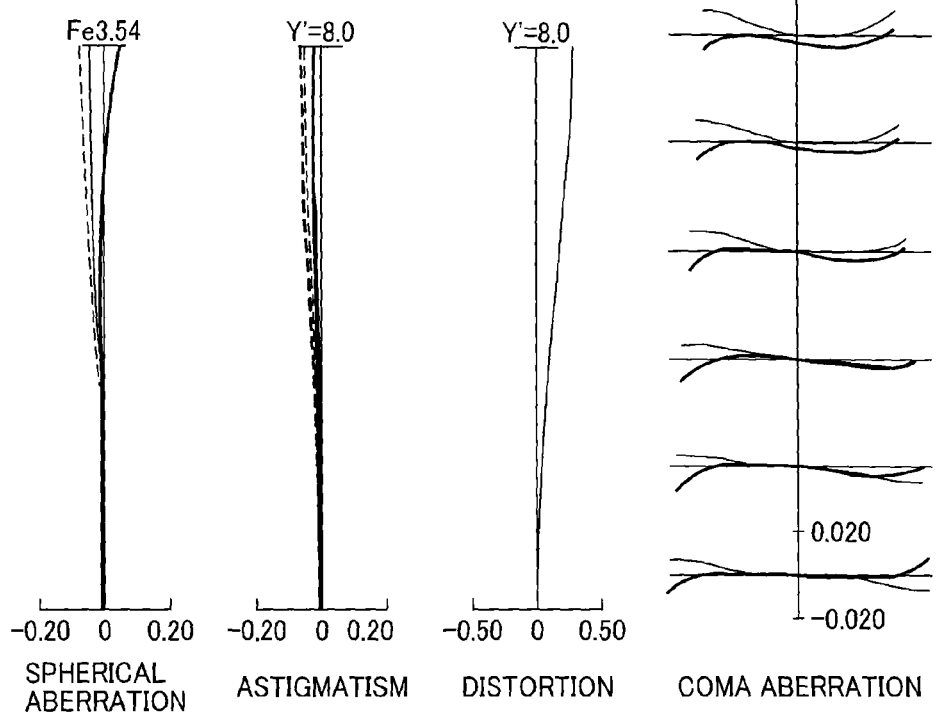
FIG. 12 is a diagram illustrating aberrations of the image forming lens according to the third example in a state that focusing is performed on an object with an imaging magnification of −0.15 times.
Figure 13:
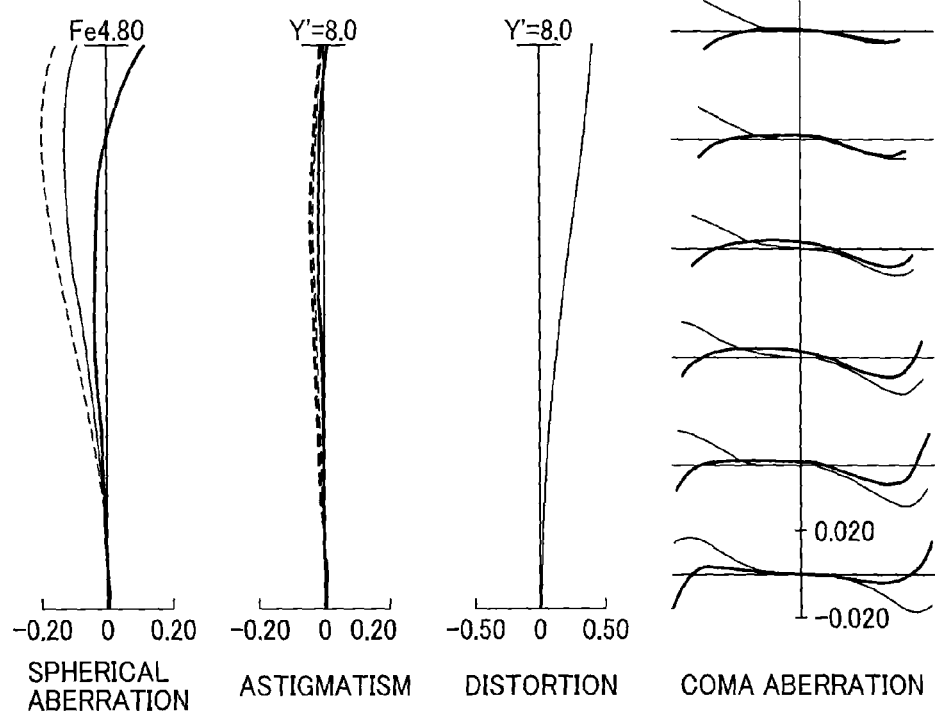
FIG. 13 is a diagram illustrating aberrations of the image forming lens according to the third example in a state that focusing is performed on an object with an imaging magnification of −0.3 times.

FIGS. 11 to 13 are diagrams illustrating aberration curves of the image forming lens according to the third example.

FIG. 11 is the diagram illustrating the aberration curves of the image forming lens according to the third example in a state that "focusing is performed on an infinite distance object".

FIG. 12 is the diagram illustrating aberrations in a state that focusing is performed on an "object with an imaging magnification of −0.15 times", and FIG. 13 is the diagram illustrating aberrations in a state that focusing is performed on an "object with an imaging magnification −0.3 times".

Figure 16:
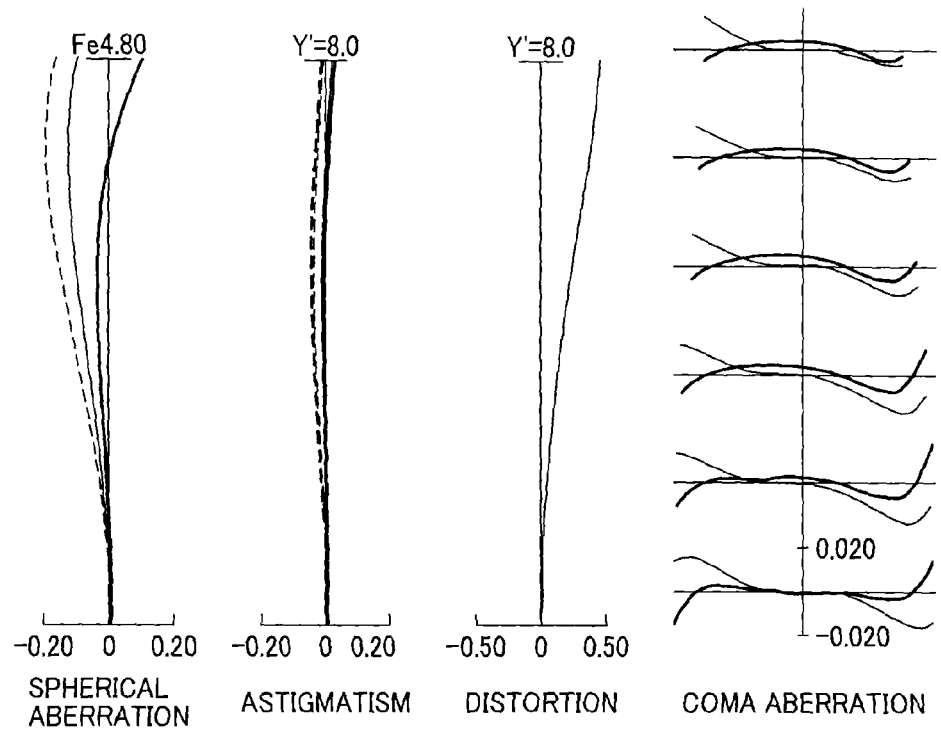
FIG. 16 is a diagram illustrating aberrations of the image forming lens according to the fourth example in a state that focusing is performed on an object with an imaging magnification of −0.3 times.

FIGS. 14 to 16 are diagrams illustrating aberration curves of the image forming lens according to the fourth example.

FIG. 14 is the diagram illustrating the aberration curves of the image forming lens according to the fourth example in a state that "focusing is performed on an infinite distance object".

FIG. 15 is the diagram illustrating aberrations in a state that focusing is performed on an "object with an imaging magnification of −0.15 times", and FIG. 16 is the diagram illustrating aberrations in a state that focusing is performed on an "object with an imaging magnification −0.3 times".

In these diagrams of aberrations, dashed lines in the spherical aberration diagrams indicate "sine conditions", and in the diagrams of "astigmatism", solid lines indicate "sagittal" and dashed lines indicate "meridional".

Further, in these diagrams of aberration, thin lines indicate "d lines" and thick lines indicate "g lines".

In all of the respective examples, the aberrations are corrected at a high level, and the spherical aberration and axial chromatic aberration are too small to be a problem. The astigmatism, field curvature, and a chromatic aberration of magnification are also small enough, a coma aberration and disorder of color differences thereof are well suppressed up to an outermost peripheral portion, and an absolute value of distortion is also 0.5% or less.

Moreover, "variation of aberrations" is extremely small in the states that: focusing is performed on the infinite distance object; focusing is performed on the object with the imaging magnification −0.15 times; and focusing is performed on the object with the imaging magnification −0.3 times.

In other words, all of the image forming lenses in the first to fourth examples provide the image forming lens having performance that is little varied due to focusing with the two-lens group structure.

More specifically, the image forming lens in which the astigmatism, field curvature, chromatic aberration of magnification, color difference of coma aberration, distortion, etc. are sufficiently suppressed can be achieved by setting the field angle at about 12 degrees, the F number at about 2.8, and the number of lenses at about seven pieces.

The image forming lens has "resolving power supporting an image sensor of 6 million to 10 million pixels", and achieves high contrast from the widely-opened stop without any disorder of point images up to peripheral portions of the field angle.

Therefore, the image forming lens can provide high performance from the infinite distance object to the short distance object with the magnification of 0.3 times or more with the simple structure while being "capable of capturing a straight line as a straight line without distortion".

An exemplary system of an "image input device for machine vision" using an image capturing device will be described based on FIG. 17.

Figure 17:
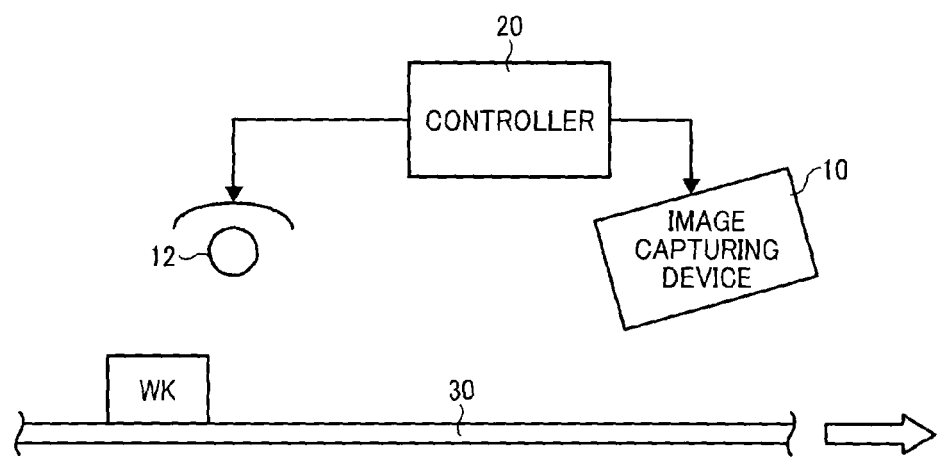
FIG. 17 is a diagram illustrating a system of an image capturing device according to one embodiment.

This "system" is used to perform product inspection, and an image of a work WK is captured and input as an image by an image capturing device 10 while the work WK is conveyed rightward of FIG. 17 as an inspection object by a conveyer 30.

For the image capturing device 10, an image forming lens recited in any one of the working examples, for example, any one of those recited in the first to fourth examples is used.

A controller 20 formed as a computer, a central processing unit (CPU), or the like controls driving of the conveyer 30 and blinking of a lighting system 20, and also controls focusing of an image forming lens and image capturing by an image sensor.

As the work WK, products in various sizes are inspected. The controller 20 specifies an appropriate working distance (imaging magnification) in according to the size of the work WK, and controls focusing of the image forming lens in accordance with the specified working distance.

As described above, the image forming lens and the image capturing device using this image forming lens can be provided.

While preferred working examples of the present invention have been described above, the present invention is not limited to the above-described specific embodiments, and various kinds of modifications and changes can be made in a scope of the gist of the present invention recited in the claims, unless otherwise specifically stated in the above description.

More specifically, the image forming lens of the present invention can be applied not only to the image input device for machine vision but also to a digital camera, a video camera, a monitoring camera, and so on.

The effects recited in the working examples of the present invention are merely exemplary preferred effects brought by the present invention, and the effects brought by the present invention are not limited to "those recited in the working examples".

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. An image forming lens comprising:
a sequential arrangement of, from an object side to an image side, a first lens group having positive refractive power, an aperture stop, and a second lens group having positive or negative refractive power with no intervening lens or lens group and with no lens or lens group on the object side of the first lens group,
wherein
the first lens group consists of a sequential arrangement of, from the object side to the image side, a first positive lens, a second positive lens, a negative lens, and a third positive lens,
the second lens group consists of a sequential arrangement of a negative lens group and a positive lens group from the object side to the image side, and
a conditional expression (1) is satisfied:

$$0.15 < D1a/D1 < 0.50 \qquad (1),\text{ where}$$

D1a is an air space between the first positive lens and the second positive lens in the first lens group, and D1 is a distance on an optical axis from an object-side lens surface of the first positive lens to an image-side lens surface of the third positive lens in the first lens group.

2. The image forming lens according to claim 1, wherein a conditional expression (2) is satisfied:

$$0.2 < D1b/D1 < 0.6 \qquad (2),\text{ where}$$

D1b is an air space between an object-side surface of the second positive lens and an image-side surface of the negative lens in the first lens group, and D1 is a distance on an optical axis from the object-side lens surface of the first positive lens to an image-side lens surface of the third positive lens.

3. The image forming lens according to claim 1, wherein a partial dispersion ratio $P_{g,F}$ is defined as an expression:

$$P_{g,F} = (n_g - n_F)/(n_F - n_C),\text{ where}$$

$n_d$ is a refractive index with respect to d line, $v_d$ is an Abbe's number, and $n_g$, $n_F$, $n_C$ are refractive indexes with respect to g line, F line, C line of material quality of the lens, and
the partial dispersion ratio satisfies following conditional expressions (3) to (5) relative to at least one of the first positive lens and the second positive lens in the first lens group:

$$1.45 < n_d < 1.65 \qquad (3),$$

$$60.0 < v_d < 95.0 \qquad (4),\text{ and}$$

$$0.005 < P_{g,F} - (-0.001802 \times v_d + 0.6483) < 0.050 \qquad (5).$$

4. The image forming lens according to claim 1, wherein a conditional expression (6) is satisfied:

$$0.25 < (R11 - R32)/(R11 + R32) < 0.45 \qquad (6),\text{ where}$$

R11 is a curvature radius of the object-side surface of the first positive lens in the first lens group, and R32 is a curvature radius of an image-side lens surface of the negative lens in the first lens group.

5. The image forming lens according to claim 1, wherein a conditional expression (7) is satisfied:

$$0.1 < (R41 - R32)/(R41 + R32) < 0.3 \qquad (7),\text{ where}$$

R32 is a curvature radius of the image-side lens surface of the negative lens in the first lens group, and R41 is a curvature radius of an object-side surface of the third positive lens.

6. The image forming lens according to claim 1, wherein a conditional expression (8) is satisfied:

$$0.1 < (R21 - R32)/(R21 + R32) < 0.3 \qquad (8),\text{ where}$$

R21 is a curvature radius of an object-side surface of the second positive lens in the first lens group, and R32 is a curvature radius of the image-side lens surface of the negative lens in the first lens group.

7. The image forming lens according to claim 1, wherein a conditional expression (9) is satisfied:

$$0.4 < D2a/D2 < 0.7 \qquad (9),\text{ where}$$

D2a is an air space between the negative lens group and the positive lens group in the second lens group, and D2 is a distance on an optical axis from a lens surface closest to the object side in the negative lens group to a lens surface closest to the image side in the positive lens group in the second lens group.

8. The image forming lens according to claim 1, wherein the negative lens group comprises a cemented lens of a positive lens and a negative lens, and the positive lens group comprises one positive lens in the second lens group.

9. The image forming lens according to claim 1, wherein all of the lenses forming the first lens group and the second lens group are spherical lenses.

10. An image capturing device comprising the image forming lens according to claim 1.

11. An image forming lens comprising:
a sequential arrangement of, from an object side to an image side, a first lens group having positive refractive power, an aperture stop, and a second lens group having positive or negative refractive power with no intervening lens or lens group,
wherein
the first lens group consists of a sequential arrangement of, from the object side to the image side, a first positive lens, a second positive lens, a negative lens, and a third positive lens,
the second lens group consists of a sequential arrangement of a negative lens group and a positive lens group from the object side to the image side,
the second lens group is fixed relative to an image surface and the first lens group is moved integrally to the object side when focusing is performed from an infinite distance object to a short distance object, and
a conditional expression (11) is satisfied:

$$0.50 < f1/f < 0.90 \qquad (11),\text{ where}$$

f1 is a focal length of the first lens group, and f is a focal length of an entire system in a state that focusing is performed on the infinite distance object.

12. The image forming lens according to claim 11, wherein the aperture stop is fixed relative to the image surface together with the second lens group when focusing is performed from the infinite distance object to the short distance object.

13. The image forming lens according to claim 11, wherein a conditional expression (12) is satisfied:

$$0.03 < M1/f < 0.10 \qquad (12),\text{ where}$$

M1 is a moving amount of the first lens group when focusing is performed from the infinite distance object to an object with an imaging magnification of −0.15 times, and f is the focal length in the entire system when focusing is performed on the infinite distance object.

14. The image forming lens according to claim 11, wherein a conditional expression (13) is satisfied:

$$0.10 < M2/f < 0.15 \quad (13),$$ where

M2 is a moving amount of the first lens group when focusing is performed from the infinite distance object to an object with an imaging magnification of −0.3 times, and f is the focal length in the entire system when focusing is performed on the infinite distance object.

15. The image forming lens according to claim 11, wherein a conditional expression (14) is satisfied:

$$0.40 < D2a/D2 < 0.70 \quad (14),$$ where

D2a is an air space between the negative lens group and the positive lens group in the second lens group, and D2 is a distance on an optical axis from a lens surface closest to the object side in the negative lens group to a lens surface closest to the image side in the positive lens group in the second lens group.

16. The image forming lens according to claim 11, wherein the negative lens group comprises a cemented lens of a positive lens and a negative lens, and the positive lens group comprises one positive lens in the second lens group.

17. The image forming lens according to claim 11, wherein a partial dispersion ratio $P_{g,F}$ is defined as an expression:

$$P_{g,F} = (n_g - n_F)/(n_F - n_C),$$ where $n_d$ is a refractive index with respect to d line, $v_d$ is an Abbe's number, and $n_g$, $n_F$, $n_C$ are refractive indexes with respect to g line, F line, C line of material quality of the lens, and the partial dispersion ratio satisfies following conditional expressions (15) to (17) relative to at least one of the first positive lens and the second positive lens in the first lens group:

$$1.45 < n_d < 1.65 \quad (15),$$

$$60.0 < v_d < 95.0 \quad (16),\text{ and}$$

$$0.005 < P_{g,F} - (-0.001802 \times v_d + 0.6483) < 0.050 \quad (17).$$

18. The image forming lens according to claim 11, wherein a conditional expression (18) is satisfied:

$$0.2 < D1a/D1 < 0.5 \quad (18),$$ where

D1a is an air space between the first positive lens and the second positive lens in the first lens group, and D1 is a distance on an optical axis from an object-side surface of the first positive lens to an image-side surface of the third positive lens in the first lens group.

19. The image forming lens according to claim 11, wherein all of the lenses forming the first lens group and the second lens group are spherical lenses.

20. An image capturing device comprising the image forming lens according to claim 11.

* * * * *